Patented Mar. 27, 1951

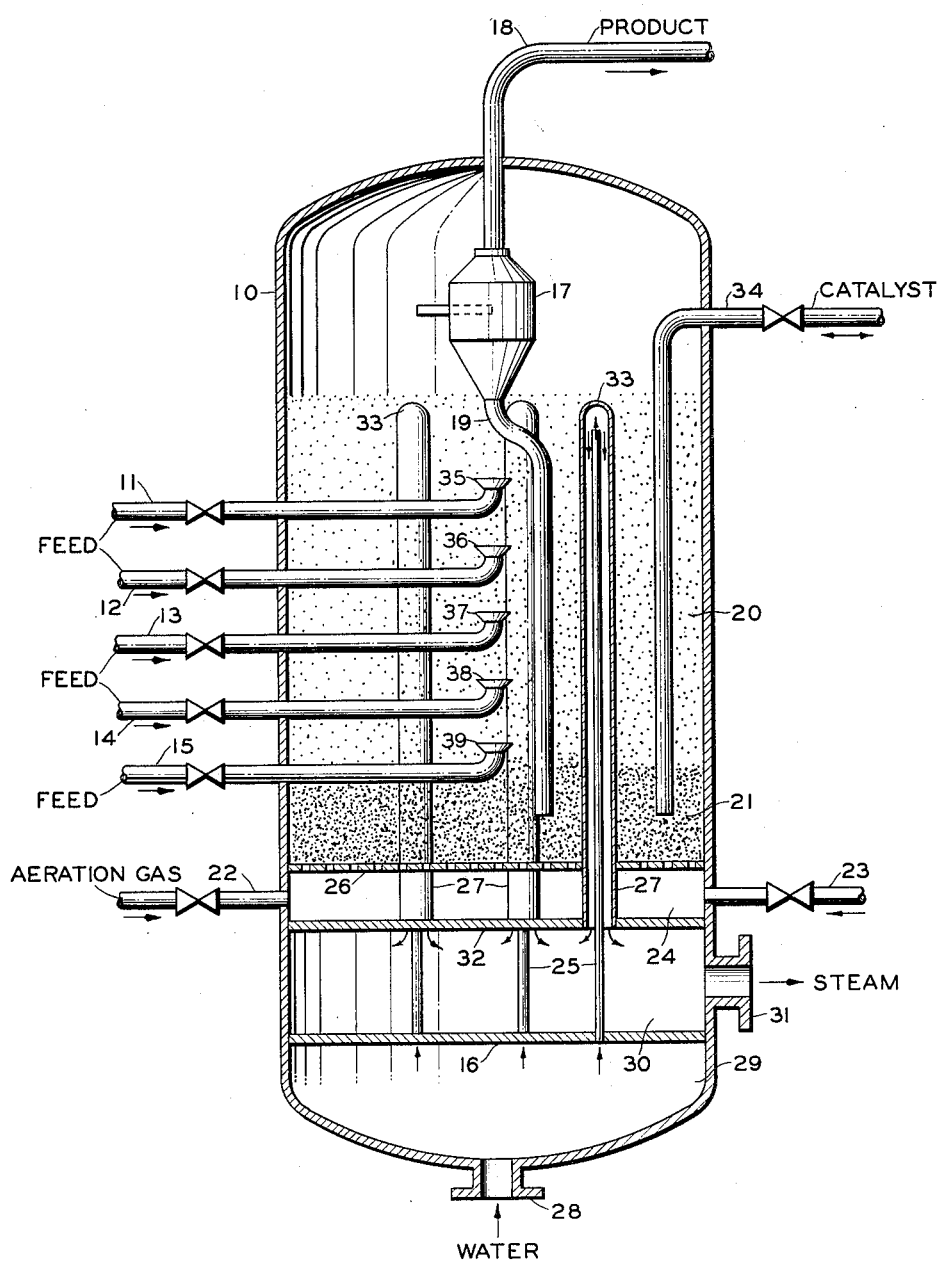

2,546,570

UNITED STATES PATENT OFFICE 2,546,570

FLUIDIZED BED REACTOR

Frank P. Vance, Jr., Bartlesville, Okla., assignor to Phillips Petroleum Company, a corporation of Delaware Application November 15, 1948, Serial No. 60,071

9 Claims. (Cl. 260—449.6)

This invention relates to a fluidized bed reactor and a process for operating same. In one of its more specific aspects, it relates to an improved stationary fluidized bed reactor and an improved process for operating same.

In processes utilizing fluidized fixed bed reactors and fluidized bed reactors in which exothermic or endothermic heat of reaction is involved, it is very desirable to have efficient removal or introduction of heat. One such method is to introduce a heat transfer material, such as water, through heat exchange tubes placed within the reactor, removing the heat by converting the water to steam. In utilizing such cooling or heating apparatus, it is important to maintain the heat exchange tubes within the fluidized bed of catalyst so that efficient heat transfer may be maintained. Whenever it is necessary to change the catalyst bed depth, which may be due to an increase or decrease in reactant flow rate, need for more intense catalytic treatment, etc., it has also been necessary to vary the position of the cooling tubes so that they remain within the fluidized bed, and extend the full length of said bed thus providing maximum efficiency and uniform heating or cooling throughout the catalyst zone. To make such changes it has been necessary to take the reactor out of service and disassemble it to a great extent so that the heat exchange surfaces may be lowered or raised to correspond with an increase or decrease in catalyst bed depth. It is obvious that it would be of great advantage if a method was devised whereby these adjustments might be made without the economic loss caused by lost on-stream time and the expenditure for manpower to disassemble, make the necessary adjustments, and then reassemble the unit.

It is an object of this invention to provide a new and improved fluidized bed reactor.

Another object of this invention is to provide an improved process for operating a fluidized bed reactor.

Another object is to provide a process wherein the catalyst bed depth in a stationary fluidized bed reactor may be varied with minimum interruption of the process.

Another object is to provide an economically operated stationary fluidized bed reactor.

Another object of this invention is to provide a stationary fluidized bed process in which the catalyst bed depth may be adjusted according to the flow of reactants therethrough with a minimum of interruption of the process.

Still another object is to provide a stationary fluidized bed apparatus wherein hydrocarbons may be manufactured by the Fischer-Tropsch synthesis process and wherein the depth of the catalyst bed may be adjusted rapidly and with little loss of on-stream time.

Further objects and advantages of this invention will be apparent to one skilled in the art from the accompanying disclosure and discussion.

I have invented a new and improved fluidized bed reaction chamber and a process for operating same wherein the size of the fluidized bed of catalyst, i. e., the depth and volume, may be adjusted in response to the flow rate and desired contact time of materials introduced thereto. My invention provides both an apparatus and a process for using same wherein reactions requiring the removal of heat or the introduction of heat may be carried out. My invention is particularly adaptable to such reactions as the production of hydrocarbons from carbon-monoxide and hydrogen according to the Fischer-Tropsch process, and those processes which are exothermic and from which heat of reaction must be removed.

In one embodiment of my invention, utilizing an otherwise conventional reactor with vertical bayonet type heat exchange elements adapted for fluidized bed operation, the catalyst is maintained in two phases, a fluidized reaction phase, and an aerated more dense phase, the latter phase being at the bottom of the catalyst bed. The dense phase of catalyst is aerated by a stream of gas, such as recycle tail gas or an inert gas at a low flow rate so that it will not pack. Along the sides of the reactor are placed numerous feed inlet pipes with gas distributors attached thereto. The spacing and position of the inlets and distributors may be any that will provide a distance between the distributors of 6 to 12 inches, or sometimes as much as 24 inches, depending on the length of the reactor and the desired depth of the catalyst bed. In a preferred embodiment, the gas inlets are placed in the same vertical plane, the gas distributors being one above the other. Any suitable gas distributing means which will not interfere greatly with the fluidized bed by being too bulky or large may be used. By introducing feed gas to the reactor at the uppermost inlet and distributor at a suitable rate, a very shallow fluidized bed may be obtained, whereas, if the gas is introduced at the bottom inlet and distributor at a sufficient flow rate a much deeper fluidized bed will be attained. When the feed gas is introduced through the uppermost gas distributor, the dense phase of the catalyst bed will extend upward to this point. Thus, the dense phase of catalyst will always extend up to the bottommost gas distributor used. When changing a portion of the catalyst bed from dense phase to fluidized phase, thus increasing the depth of the fluidized bed, it is obvious that an excess of catalyst will then be present in the fluidized phase, and when going in the other direction, from fluidized phase to dense phase, there will be a lack of catalyst. To take care of this fluctuation in size of the catalyst phases, a downcomer or other inlet and outlet means is placed within the reactor extending into the dense phase of catalyst and near the bottom thereof. This downcomer is connected to a catalyst reservoir by suitable pumps so that catalyst may be added or removed from the dense phase when the size of the fluidized bed is adjusted. Product gases from such a reaction chamber are removed overhead after first being passed through a cyclone separator or other suitable separation means to remove any entrained catalyst. Any thus-separated catalyst is returned to the aerated, dense phase catalyst bed. During all on-stream operation the top of the fluidized catalyst phase will be maintained at the same position relative to the reaction chamber, no matter what the depth of the catalyst bed may be. However, while changing from one bed depth to another there may be some fluctuation of the position. This is corrected, however, by fine adjustments in flow rate or in the size of the dense phase, etc. The flow rate of gas through the catalyst to maintain it in fluidized phase is necessarily greater than the flow rate to maintain it in a fluidized dense phase.

Catalyst as referred to in the specification and claims is any catalyst which may be adapted to a fluidized process, i. e., which may be crushed, finely divided, pelleted, extruded and cut, or in any fashion made into small particles. Suitable particle sizes of catalyst may range from those as large as 30 or 40 mesh down to 200 to 225 mesh or smaller. My invention is not to be limited by the particular type or composition of the catalyst other than that it must be solid and "fluidizable."

In describing my invention, I have referred to a "fluidized phase" and a "fluidized dense phase," "dense phase," or "aerated phase" of catalyst. The latter three terms, "fluidized dense phase," "dense phase," and "aerated phase" are synonymous with one another and may be used interchangeably. "Fluidized phase" refers to the condition of a finely divided catalyst maintained in a highly turbulent agitated state by the passing of reactant gas or gases therethrough. This differs considerably from the "fluidized dense phase" or "aerated phase" of catalyst which is formed by passing only sufficient gas therethrough to keep it from packing, and wherein the linear gas flow rate is lower than in the "fluidized phase."

In the appended claims the two different catalyst phases have been described as the "less dense" and the "more dense" catalyst phases or beds. The first of these terms corresponds to the term "fluidized phase," and the latter term refers to the "fluidized dense phase," "dense phase," and "aerated phase" of catalyst, which terms have been discussed above.

A further understanding of some of the many aspects of my invention may be had by referring to the attached drawing which is a vertical cross-section, in conjunction with the following discussion, said discussion also serving to exemplify my invention. Various additional valves, pumps, and other conventional equipment, necessary for the practice of this invention, will be familiar to one skilled in the art and have been omitted from the drawing for the sake of clarity.

The description of the drawing provides one method of operating my process. It is understood, however, that while this is representative in general of my process, various minor changes may be made in adapting it to the various conditions within the scope of the invention.

Refer now to the drawing. Number 10 indicates a vertical cylindrical shell, usually constructed of metal and closed at either end, which serves as a reaction chamber. Under most conditions it is preferable that the length of said metal shall be somewhat greater than the diameter thereof. Numbers 11 through 15 indicate a plurality of inlet means for feed stock positioned along the length of said shell, each above the other. Numbers 35 to 39 are gas distributors attached to said gas inlets, preferably in axial alignment with respect to said chamber. However, it may be desirable to place the gas inlet in one plane around the chamber, varying the distance between the gas distributors as desired within the reaction chamber. It is obvious, by observing the drawing, that inefficient fluidization of the catalyst will be had by introducing the feed gas along one side of the catalyst chamber without extending the feed inlets into the chamber. It is generally preferred in constructing a reaction chamber according to my invention and operating same according to my process to extend the feed inlets 11 to 15 into the reaction chamber and attaching to the ends thereof suitable gas distributing means 35 to 39, said gas distributors being of a conventional design, but of such a size and shape as to not interfere with the fluidization of the catalyst. It is within the scope of my invention to use more than one gas inlet and distributor in the same horizontal plane. This may be advisable to provide a more even level of the fluidized bed when a particularly large reactor is being used. When such an arrangement is used, it is desirable that each layer of feed inlets and attached gas distributors be placed in a plane horizontal with respect to the reactor and in a symmetrical fashion within the reactor. Further, when such an arrangement is used, it is usually preferable to use more than two inlets and gas distributors in each layer or plane, particularly when the reactor is of a cylindrical design.

Number 28 is an inlet means in the bottom of the reaction chamber for fluid coolant, axially positioned therewith. Number 16 indicates a tube sheet comprising a partition which forms a zone 29 for inlet coolant and acts as a support for the inlet portion 25 of cooling tubes 27, said cooling tubes or heat exchange tubes whose centers are on a circle concentrically positioned within said shell and terminating at a given level in the upper part of said chamber. These tubes may be positioned other than concentrically, however, the prime importance is that they are spaced so that uniform cooling or heating is obtained. Number 32 indicates a second tube sheet comprising a second partition above tube sheet 16 and forming with same a zone 30 for outgoing heated coolant and which supports coolant outlets 33 of cooler 27. Each of said coolant outlets 33 is concentrically positioned around a corresponding inlet, thereby forming what is known as a bayonet type of cooling tube. Outlet 31 is positioned in the side of chamber 10 such that heated coolant may be removed from zone 30. Number 26 indicates a horizontally positioned perforate plate placed above tube sheet 32 and forming gas space 24 therebetween. Inlets 22 and 23 are positioned in shell 10 in such a manner that a gaseous material may be passed through same and into gas space 24 for fluidizing the lower dense phase catalyst in zone 21. Number 34 indicates an inlet or outlet for catalyst, and extends downward and in close proximity to perforate plate 26 in such a manner that its open end within said reactor remains within the dense phase 21 of the catalyst. This inlet or outlet may be positioned in any manner so long as the end within the catalyst chamber extends into the dense phase of catalyst. Suitable means (not shown) for withdrawing or introducing catalyst via inlet 34 is attached to the outer end thereof. Number 17 indicates a catalyst separator, such as a cyclone separator, located above fluidized bed 20 for separating entrained catalyst from effluent gases. Conduit 19 is a catalyst return line extending downwardly from said separator into the dense phase of catalyst. Conduit 18 is an outlet for effluent gases from the catalyst chamber and cyclone separator 17. It may be desirable under some conditions of operation to utilize apparatus other than a cyclone separator for the separation of entrained catalyst from effluent gases. One particular type of apparatus which may be adapted for use with my apparatus is the electrostatic precipitator, one of which is well known to those skilled in the art as the Cottrell precipitator. It is obvious that such an apparatus could not be contained within the reaction chamber of my invention, and the only requirement is that the separated catalyst must be returned to the dense phase catalyst bed, or to a regeneration unit hereinafter described.

My apparatus and process may also be utilized in the moving bed type of fluidized bed reactor which employs internal cooling means. The only change in the apparatus will be to provide catalyst inlets and outlets such that for any size of catalyst bed, there will be an inlet and outlet for fluidized catalyst.

It is also within the scope of my invention to heat the materials within chamber 10 by passing hot gases or other heated materials through the heat exchangers, thereby imparting heat for endothermic reactions. Other heat exchange apparatus such as coils, pipes, and the like may be used in my apparatus rather than the bayonet type of heat exchanger.

The following discussion will show how my process and apparatus may be utilized very successfully for the Fischer-Tropsch synthesis of hydrocarbons utilizing a powdered iron catalyst. Carbon monoxide-hydrogen synthesis gas is introduced to the reactor through feed inlet 13 along with a desired amount of recycle tail gas. The fluidized catalyst bed extends from feed inlet 13 upward to just above the tops of the heat exchange units. If it is desirable to vary the recycle ratio of tail gas to feed, it will be necessary to change the amount of catalyst in the fluidized phase if the linear velocity and space velocity through the reactor are to be maintained constant. In using my process to decrease the recycle ratio and accordingly increase the fluidized catalyst phase volume, the following procedure should be followed.

1. The fresh feed, or in this case, the carbon monoxide-hydrogen synthesis gas, is shut off from inlet 13 by means, not shown, and the linear velocity through the fluidized catalyst is maintained by increasing the volume of recycle tail gas by other means not shown.

2. The estimated amount of catalyst is removed from the dense phase to allow for the increased size of the fluidized catalyst phase by means of catalyst outlet 34. As an example, the dense phase catalyst may be removed down to the level of feed inlet 14.

3. The recycle gas is then gradually switched from inlet 13 to inlet 14.

4. The dense phase catalyst level is then finely adjusted to the exact level to give the desired volume of fluidized catalyst by introducing or withdrawing the required amounts of catalyst through conduit 34.

5. The synthesis gas is then introduced into the chamber via inlet 14 and brought to the desired flow rate, while simultaneously the recycle ratio of the tail gas is cut down.

It is feasible to introduce the tail gas through one of the feed inlets while the synthesis gas is introduced through another, or to introduce a portion of the tail gas or an inert gas through inlets 22 and 23 to aerate the dense catalyst phase. In so operating, the volume of tail gas used should be calculated in with the volume of the gas introduced through feed inlets 11 to 15.

Under some conditions of operation, depending on the process carried out and the catalyst used, the catalyst may be continually or intermittenly passed to a regeneration unit. It is desirable to be able to regenerate the catalyst without any interruption of the process flow. This may be accomplished by passing a portion of the fluidized phase to a regeneration unit and returning regenerated catalyst to the dense phase by means not shown. Regeneration of any particular catalyst will be well within the skill of the art and will, therefore, not be discussed herein.

My invention provides a new apparatus and process for adjusting the catalyst bed depth in a fluidized catalytic process more easily and without the necessity of extended cessation of operation. Valve adjustments to provide the desired flow rate of feed and aerating gas, and pumping apparatus for introducing or withdrawing catalyst are all that is necessary.

Although this apparatus has been described and exemplified in terms of its preferred modifications, it is understood that various changes may be made without departing from the spirit and scope of the disclosure and of the claims.

I claim:

1. A process for catalytically treating gaseous reactant in a dense fluidized catalyst bed, which comprises introducing a gas to the bottom of a reaction zone containing a particulate fluidizable catalyst in only sufficient quantity to maintain the catalyst thereabove in a dense fluidized bed phase, introducing gaseous reactant to said reaction zone at at least one point above the bottom thereof at a sufficient rate to maintain the catalyst above the inlet zone in a less dense fluidized bed phase, and varying the depth of said less dense fluidized catalyst bed phase by varying the height of the reactant gas inlet zone and by introducing catalyst to the more dense phase when said depth is decreased and removing catalyst from said more dense phase when the depth is increased.

2. A process for treating gaseous reactants in the presence of a solid particulate fluidized catalyst in a dense fluidized bed, which comprises introducing a gas to the bottom of a reaction zone in only sufficient quantity to maintain the catalyst thereabove in a dense fluidized bed phase, introducing gaseous reactant to said reaction zone above the bottom thereof through at least one of a plurality of inlet zones at a sufficient rate to maintain the catalyst above said inlet zone in a less dense fluidized bed phase, removing heat from said reaction zone by indirect heat exchange, varying the depth of said less dense fluidized catalyst bed phase by varying the height of the reactant gas inlet zone and by introducing catalyst to said more dense phase when the depth is decreased and removing catalyst from said more dense phase when said depth is increased, thereby maintaining the top of said fluidized bed in the same position above the locus of heat removal, and recovering treated reactants as produces of the process.

3. An exothermic process for treating gaseous reactants in the presence of a fluidized catalyst in a dense fluidized bed, which comprises introducing a gas to the bottom of a reaction zone in only sufficient quantity to maintain the solid particulate fluidizable catalyst thereabove in a dense fluidized bed phase, introducing reactant gas to said reaction zone above the bottom thereof through at least one of a plurality of inlet zones at a sufficient flow rate to maintain the catalyst above the lowermost inlet zone in a less dense fluidized bed phase, removing heat from said reaction zone, changing the volume of said less dense fluidized catalyst bed phase when desired by varying the height of the reactant gas inlet zone and by introducing catalyst to the more dense phase when the volume is decreased, and removing catalyst from said more dense phase when said volume is increased, thereby maintaining the top of said less dense fluidized catalyst bed in the same relative position irrespective of the volume of said phase, separating reaction products from entrained catalyst and recovering same as products of the process.

4. A process for treating gaseous reactants in the presence of a dense fluidized catalyst bed, which comprises introducing a gas to the lower portion of a catalyst zone in only sufficient quantity to maintain a solid fluidizable catalyst therein in a dense fluidized bed phase, introducing gas to the upper portion of said catalyst zone through at least one of a plurality of inlet zones at a sufficient flow rate to maintain the catalyst above said inlet zone in a less dense fluidized bed phase, varying the volume of the lower more dense phase inversely to the variation in volume of said upper less dense phase in response to the flow rate of gases through said phase, maintaining the top of said less dense phase in the same relative position irrespective of the volume of said phase, and recovering effluent gases from said process as products thereof.

5. A process for treating gaseous reactants in the presence of a fluidized catalyst in a dense fluidized bed, which comprises introducing a gas to the lower portion of a catalyst zone in only sufficient quantity to maintain a solid fluidizable catalyst therein in a dense fluidized catalyst bed phase, introducing gas to the upper portion of said catalyst zone through at least one of a plurality of inlet zones at a sufficient flow rate to maintain the catalyst above said inlet zone in a less dense fluidized catalyst bed phase, varying the volume of the lower more dense phase inversely to the variation in volume of said upper less dense phase in response to a variation in contact time of said gas with catalyst in said upper less dense phase of said zone, maintaining the top of said upper less dense phase in the same position irrespective of the volume of said phase, and recovering effluent gases from said process as products thereof.

6. An exothermic process for treating gaseous reactants in the presence of a fluidized catalyst in a dense fluidized bed, which comprises introducing a gas to the bottom of a reaction zone in only sufficient quantity to maintain the solid, finely divided, fluidizable catalyst thereabove in a dense fluidized bed phase, introducing reactant gas to said reaction zone above the bottom thereof through at least one of a plurality of inlet zones, maintaining the catalyst above the gas inlet zone in a less dense fluidized bed phase by the flow of reactant gases therethrough, removing heat from the catalyst phases, changing the volume of said less dense fluidized catalyst bed phase when desired by varying the height of the reactant gas inlet zone and by simultaneously introducing catalyst to the more dense phase when the volume is decreased and removing catalyst from the more dense phase when said volume is increased, thereby maintaining the top of said less dense fluidized catalyst bed phase in the same relative position irrespective of the volume of said phase, separating reaction products from entrained catalyst, returning thus separated catalyst to said dense phase, and recovering separated gases from the top of said reaction zone as products of the process.

7. A process for treating gaseous reactants in the presence of a fluidized catalyst in a dense fluidized bed, which comprises introducing a gas to the lower portion of a catalyst zone in only sufficient quantity to maintain the catalyst therein in a dense fluidized bed phase, introducing gas to the upper portion of said catalyst zone through at least one of a plurality of inlet zones at a sufficient flow rate to maintain the catalyst above said inlet zone in a less dense fluidized phase, varying the depth of the lower more dense phase inversely to the variation in depth of said upper less dense phase in response to the flow rate of gases through said upper less dense phase by varying the position of said gas inlet zone to said less dense phase, maintaining the top of said less dense fluidized catalyst phase in the same position irrespective of the volume of said phase, introducing and withdrawing heat to said catalyst zone, separating effluent gases from entrained catalyst, and recovering said effluent gases as products of the process.

8. An endothermic process for treating gaseous reactants in the presence of a fluidized catalyst in a dense fluidized bed, which comprises introducing inert gas to the bottom of a reaction zone in only sufficient quantity to maintain the solid, finely divided fluidizable catalyst thereabove in a dense fluidized bed phase, introducing reactant gas to said reaction zone above the bottom thereof through at least one of a plurality of inlet zones, maintaining the catalyst above the gas inlet zone in a less dense fluidized phase by the flow of reactant gas therethrough, introducing heat by means of heat exchange, changing the volume of said less dense fluidized catalyst phase when desired by varying the height of the reactant gas inlet zone and by simultaneously varying the amount of catalyst in said dense phase, maintaining the top of said less dense fluidized catalyst phase in the same position irrespective of the volume of said phase, separating reaction products from entrained catalyst, returning thus separated catalyst to said dense fluidized bed phase, and recovering separated gases from the top of said reaction zone as products of the process.

9. A process for the manufacture of hydrocarbons from carbon monoxide-hydrogen synthesis gas by the Fischer-Tropsch process wherein the depth of the dense fluidized catalyst bed may be varied, which comprises introducing inert gas to the bottom of a reaction zone in only sufficient quantities to maintain the solid, finely divided, fluidizable catalyst thereabove in a dense fluidized bed phase, introducing carbon monoxide-hydrogen synthesis gas to the reaction zone at a point above said dense phase of catalyst through at least one of a plurality of inlet zones, maintaining the catalyst above the gas inlet zone in a less dense fluidized phase by the flow of gas therethrough, reacting said synthesis gas in the presence of said catalyst and thereby producing hydrocarbons, changing the volume of said less dense fluidized catalyst phase when desired by varying the position of the synthesis gas inlet zone and by simultaneously varying the amount of catalyst in said dense phase, removing heat from the catalyst phases, maintaining the top of the less dense fluidized catalyst phase in the same position irrespective of the volume of said phase, separating reaction effluent containing hydrocarbons from entrained catalyst, returning thus separated catalyst to said dense phase, and recovering effluent gases containing hydrocarbons from the top of said reaction zone as products of the process.

FRANK P. VANCE, Jr.

REFERENCES CITED

The following references are of record in the file of this patent:

UNITED STATES PATENTS

| Number | Name | Date |
|---|---|---|
| 1,964,744 | Odell | July 3, 1934 |
| 2,367,281 | Johnson | Jan. 16, 1945 |
| 2,453,740 | Becker | Nov. 16, 1948 |
| 2,460,404 | Ward | Feb. 1, 1949 |